United States Patent [19]

Bormioli

[11] 4,354,522
[45] Oct. 19, 1982

[54] FLEXIBLE CONNECTING SYSTEM FOR PIPES WITH AUTOMATIC SAFETY RELEASE IN CASE OF TENSILE STRESS

[76] Inventor: Giorgio Bormioli, Via Galileo Galilei 11, Padova, Italy, 35100

[21] Appl. No.: 169,904

[22] Filed: Jul. 17, 1980

[30] Foreign Application Priority Data

Jul. 24, 1979 [IT] Italy ............................... 24601 A/79

[51] Int. Cl.³ ............................................. F16L 37/00
[52] U.S. Cl. .............................. 137/614.02; 141/387; 285/1; 285/408
[58] Field of Search ................. 285/1, 2, 304, 33, 411, 285/408; 137/614.02, 614.03; 141/387, 284

[56] References Cited

U.S. PATENT DOCUMENTS

| 137,823 | 4/1873 | Button | 285/1 |
| 1,577,332 | 3/1926 | Lovern et al. | 137/614.02 |
| 2,166,412 | 7/1934 | Kiesel | 285/411 X |
| 2,514,717 | 7/1950 | Power | 285/1 |
| 2,948,553 | 8/1960 | Gill et al. | 137/614.02 |
| 3,383,122 | 5/1968 | Richardson | 285/1 |
| 3,886,970 | 6/1975 | Barlow et al. | 137/614.03 |
| 4,181,149 | 1/1980 | Cox | 137/614.03 |

Primary Examiner—Dave W. Arola
Attorney, Agent, or Firm—Shlesinger, Fitzsimmons & Shlesinger

[57] ABSTRACT

In order to connect a stationary pipe to a movable pipe, a flexible connecting system includes a pipe section of rigid material fixed to one of said pipes, a pipe section of flexible material fixed to the other of said pipes and an interposed connecting pipe section of rigid material connected to said rigid section so as to be movable in one direction in reply to a tensile stress exerted onto said flexible section. Said connecting pipe section is divided into two parts releasably connected to one another by a quick-release connecting device, which, in case of tensile stress, collides with a stationary structure, which causes release of said device.

4 Claims, 7 Drawing Figures

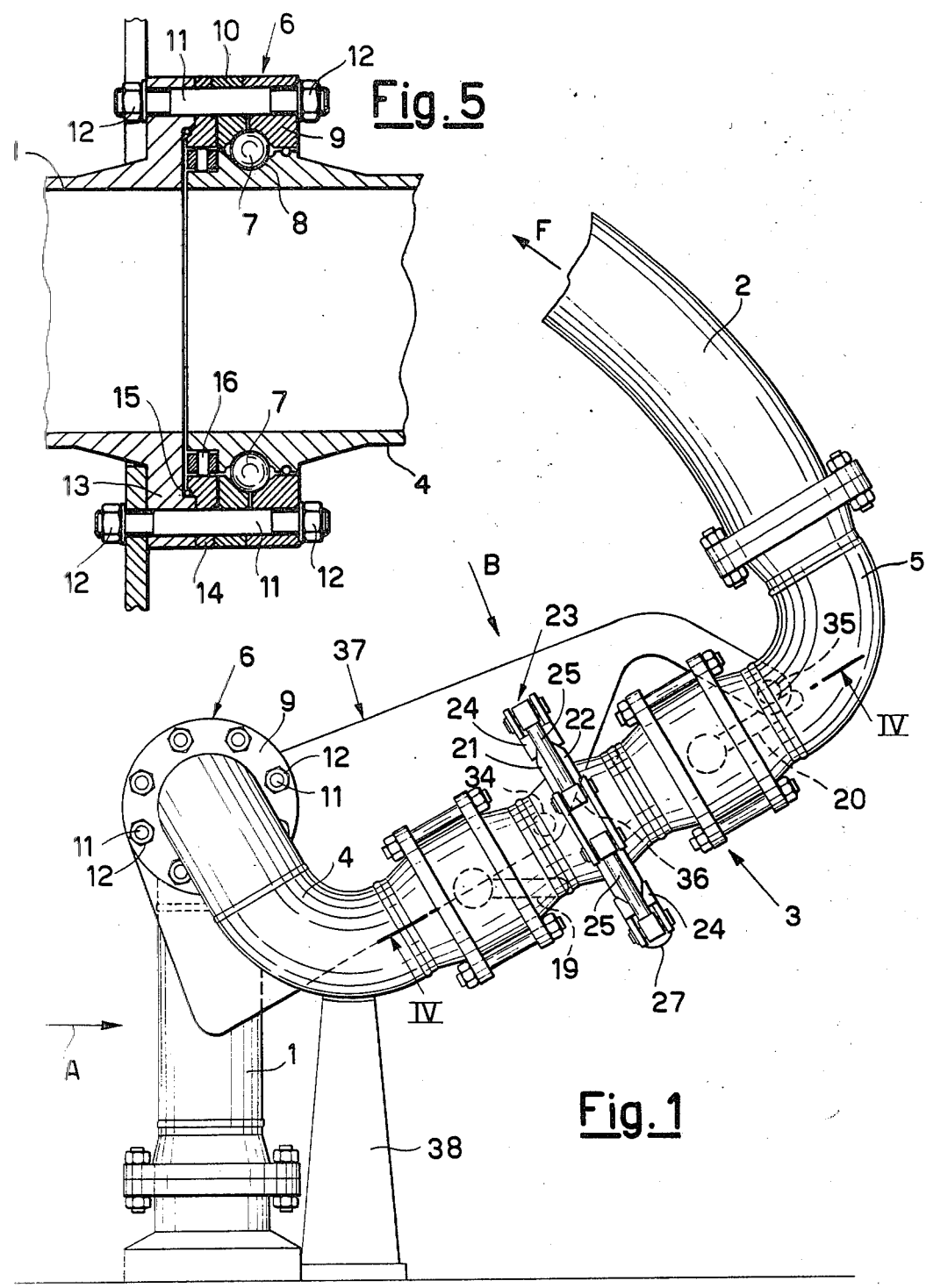

FLEXIBLE CONNECTING SYSTEM FOR PIPES WITH AUTOMATIC SAFETY RELEASE IN CASE OF TENSILE STRESS

The present invention relates to a flexible connecting system for pipes, which is able to carry out an automatic safety release in case of tensile stress.

The field of use for the flexible connecting system according to the invention is, generally speaking, that of transferring fluid products, particularly oil products, from one another of two pipes arranged on the ground and, respectively, on a ship.

The invention can however be used in general for connecting two pipes arranged anywhere, one pipe being stationary and the other pipe being movable away from the stationary one.

Flexible connecting systems for such an use are already known, as well as the related problems. In particular, it is known that there exists the problem of avoiding their damage, as well as that of the terminal apparatuses on the ground and on the ship, if either a mistake of the operator or the break age or looseness of the mooring rope causes the ship to move away from the dock, so that the flexible connection is subjected to a tensile stress. The object of the present invention is therefore to realize a flexible connecting system, which is not exposed to such risks.

According to the invention this object has been reached by a flexible connecting system arranged between a stationary pipe and a movable pipe which can be moved away from said stationary pipe, said system being characterized in that it comprises a pipe section of rigid material fixed to one of said pipes, a pipe section of flexible material fixed to the other of said pipes and a connecting pipe section of rigid material fixed to said flexible pipe section and further connected to said rigid pipe section so as to be movable with respect thereto only in one direction and in reply to a tensile stress exerted onto said flexible pipe section, said connecting pipe section being in turn composed of two separable parts which are releasably connected to one another by a quick-release connecting device of a kind capable of allowing the separation of said two pipe parts in reply to a force applied in a predetermined direction to a control member of said device, there being provided a stationary structure arranged in such a way as to be collided with by said control member and to apply to the latter for reaction a releasing force in said predetermined direction if a tensile stress exerted onto said flexible pipe section causes said movement of said connecting pipe section.

Otherwise stated, the arrangement is therefore such that, when the flexible section of the connecting system is subjected to a tensile stress as a result of an unwanted departure of the ship on which one of the two pipes to be connected is arranged, there automatically occurs a preordered movement of the connecting pipe section, which further automatically causes, by collision with the stationary structure, the quick release of the connecting device and the consequent separation of the two pipe parts. The connecting system is thus divided into two parts, one anchored to the ground and the other attached to the ship, none of which is exposed to a risk of damage.

Preferably, each of the two separable parts of the connecting pipe section is provided with a respective check valve having a respective operating lever which is caused to collide with the stationary structure and to be moved thereby to a position in which the check valve is in cut-off position when said movement caused by a tensile stress occurs. In this way, the two pipe parts into which the system is divided are also sealed and any undesirable and and possible dangerous leakage of product is avoided.

These and other features of the present invention will be made apparent by the following detailed description of an embodiment thereof, which is illustrated by way of non-limiting example in the enclosed drawings, in which:

FIG. 1 shows an elevation view of a connecting system according to the invention, in normal operating conditions;

FIG. 5 shows another enlarged-scale detail of said connecting system, as sectioned along the line V—V of FIG. 3;

Figure 3:
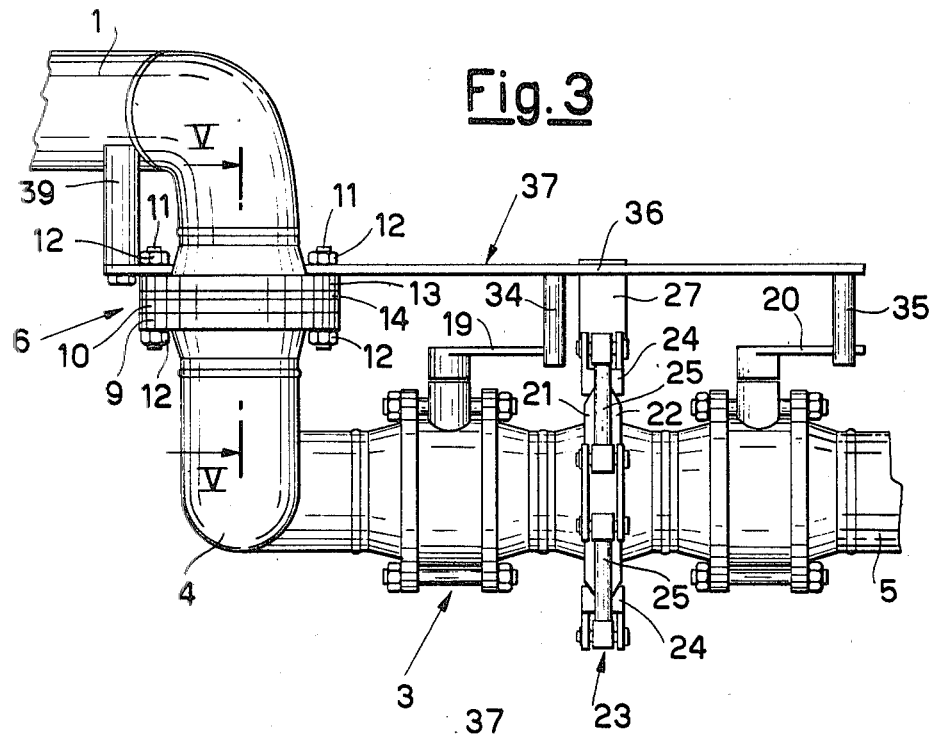
FIG. 3 shows a top plan view of said connecting system in the direction of arrow B of FIG. 1.
Figure 2:
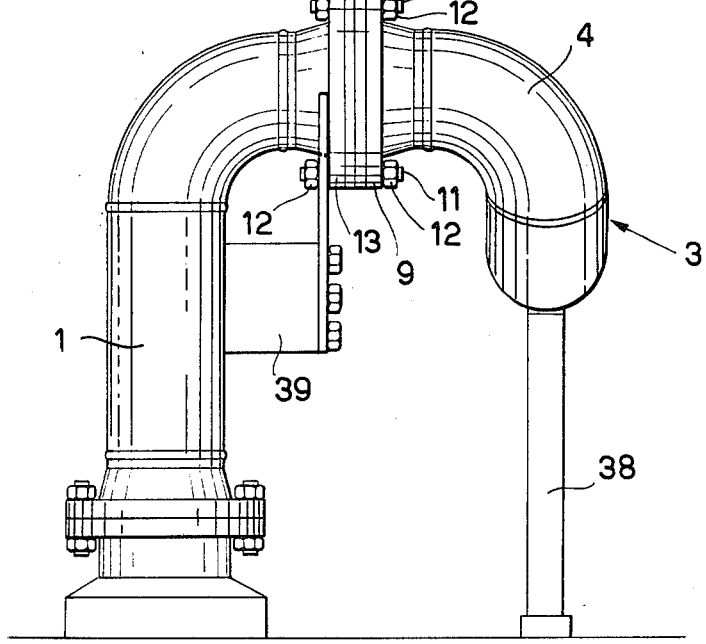
FIG. 2 shows a side view of said connecting system in the direction of arrow A of FIG. 1.

In FIGS. 1, 2 and 3 there is illustrated the assembly of a flexible connecting system for pipes, which comprises a first pipe end section of rigid material 1, which is destined to be fixed to a first pipe, particularly to a pipe arranged in fixed position on a dock, and a first pipe end section of flexible material 2, which is destined to be fixed to a second pipe, particularly to a pipe arranged on a ship for the transport of fluid products, for example oil products.

The two end sections 1 and 2 are connected to one another by a connecting pipe section 3, which is in turn composed by two elbow-shaped separable parts 4 and 5, the first of which is rotatably attached to the rigid end section 1 through a rotary joint 6 having an axis of rotation perpendicular to the joining plane of the two pipe sections 1 and 4, and the second of which is rigidly fixed, on the contrary, to the flexible end section 2.

As shown in FIG. 5, the rotary joint 6 includes a number of spheres 7, which are held in an annular groove 8 of the end of the pipe section 4 by a pair of rings 9 and 10, which screws 11 with nuts 12 tightly lock against a flange 13 of the pipe section 1 through a further ring 14. Two annular gaskets 15 and 16 are interposed between the ring 14 and the flange 13 and, respectively, between the same ring 14 and the pipe section 4.

Figure 4:
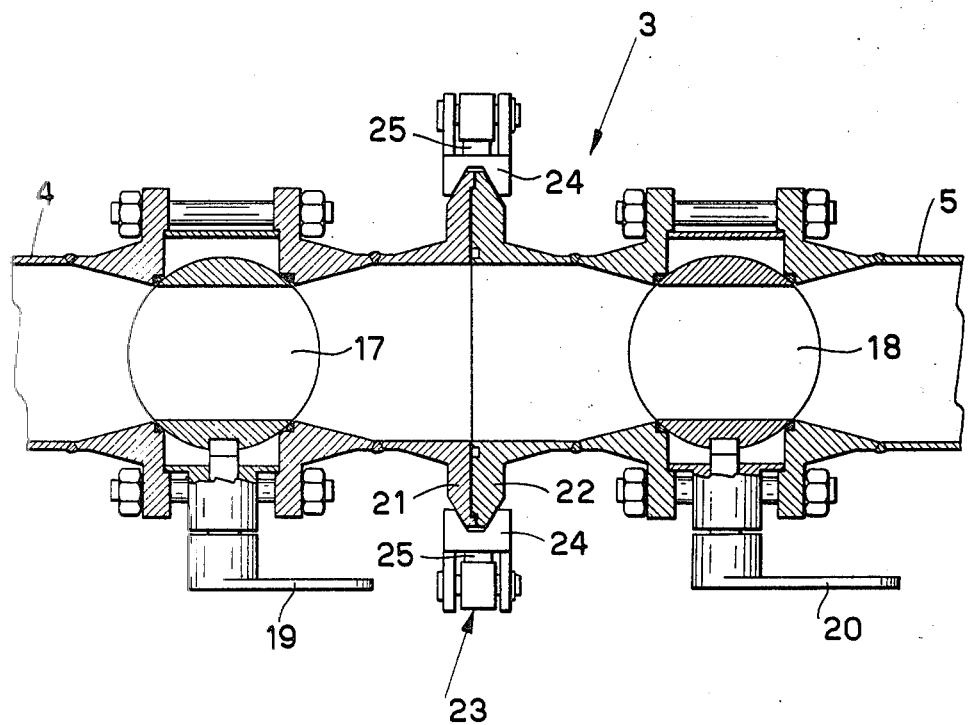
FIG. 4 shows an enlarged-scale detail of said connecting system, as sectioned along the line IV—IV of FIG. 1.
Figure 6:
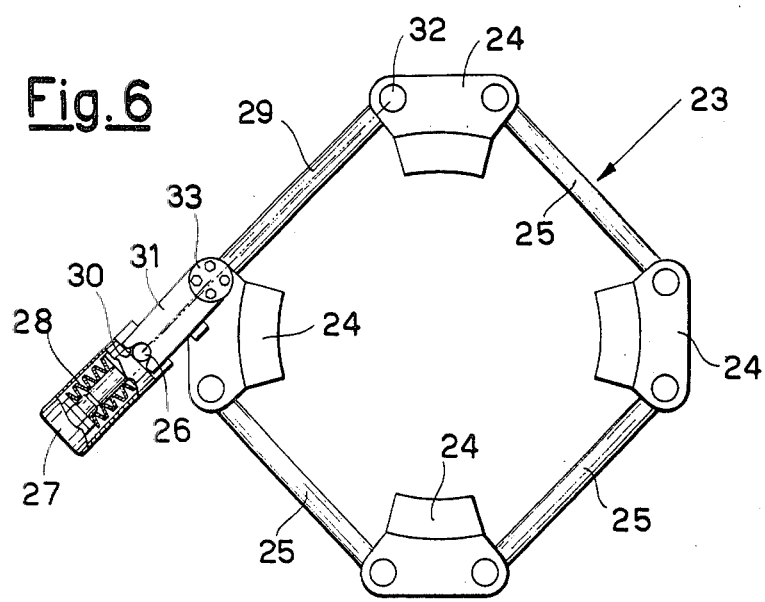
FIG. 6 shows a top plan view of the quick-release connecting device, which is comprised in said connecting system.

As shown in turn in FIG. 4, each of the two pipe parts 4 and 5 includes a respective check valve 17, 18 provided with a respective operating lever 19, 20 and has a free end provided with a respective flange 21, 22. At that end there is provided a quick-release connecting device 23, which has the function of holding normally joined the flanges 21, 22 and thereof connected the two pipe parts 4 and 5.

Said connecting device is shown in its essential lines in FIGS. 1, 3, 4 and 6, where it is seen that the device comprises an articulated succession of clamping jaws 24 and connecting rods 25, which a releasable engagement between a pin 26 extending from a head 27 axially slidingly mounted (with holding springs 28) on the free end of a closing rod 29 pivoted in 32 and a notch of a cooperating rotary arm 31 pivoted in 33 usually keeps in the form of a closed-loop chain tightened on and around the two coupled flanges 21 and 22. The engagement is spontaneously and strongly maintained since, as can be seen from FIG. 6, the theoretical line which joins the pin 26 and the pivot 32 is displaced towards the inner space of the chain with respect to the theoretical line which joins the pin 26 and the pivot 33.

With the operating levers 19 and 20 of the valves 17 and 18 and with the head 27 of the closing rod 29 of the connecting device 23 are intened to cooperate during the releasing operation, as it will better be explained hereinafter, respective parts 34, 36 and 35 of a stationary structure 37 rigidly fastened to the end flange 13 of the pipe section 1 and, through a bracket 39, to the body of the same pipe section.

Finally, there is provied a stationary support 38, which is destined to carry the connecting pipe section 3 in the position shown in FIGS. 1 and 2 against the rotary stress otherwise exerted by the same weight of the pipe section 3 (even with the help of a suitably applied extra weight).

Figure 7:
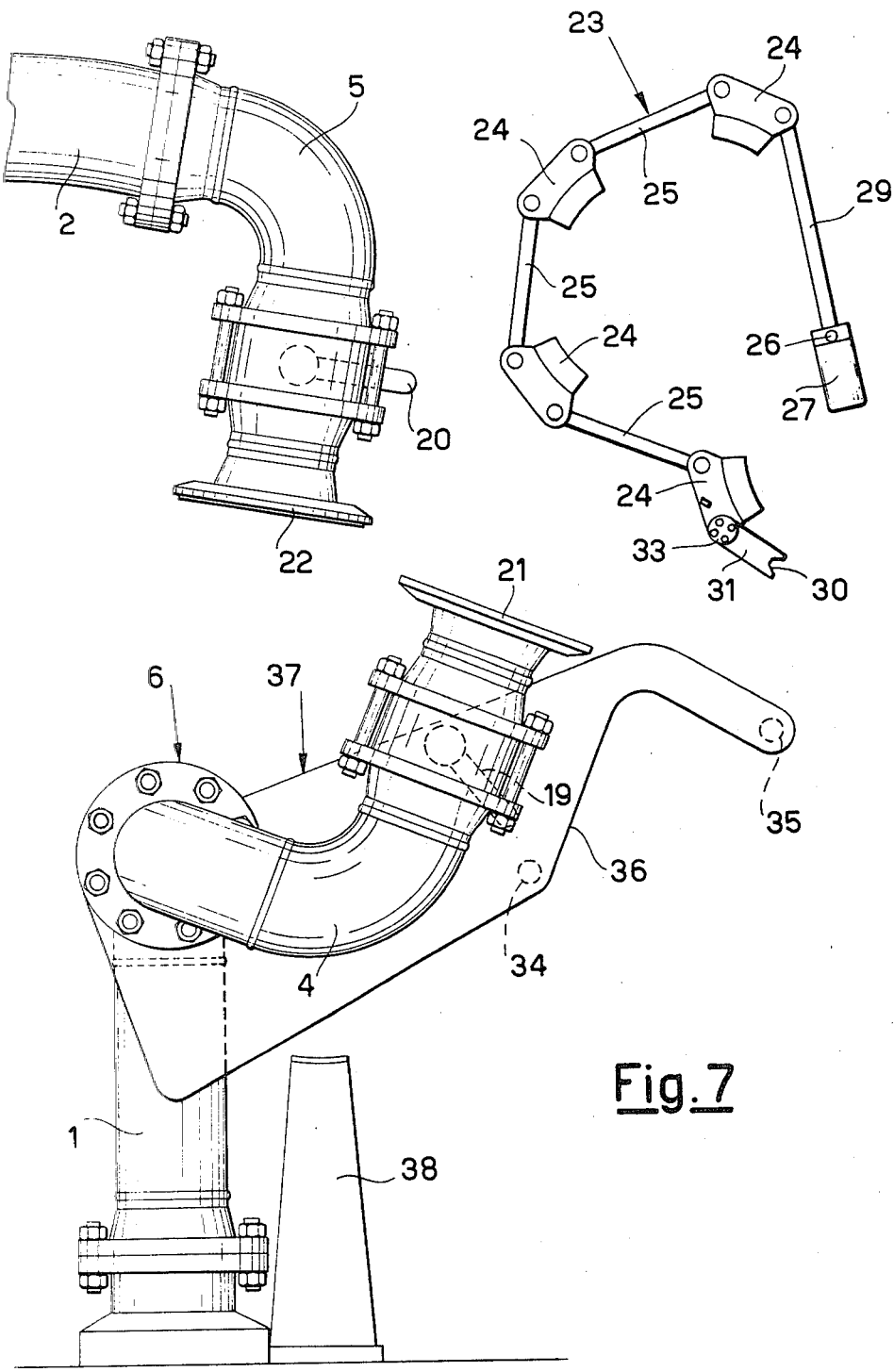
FIG. 7 shows said connecting system in elevation view such as in FIG. 1, but in a released condition subsequent to a tensile stress.

The mode of operation of the just described connecting system, and particularly its mode of reacting to possible tensile stresses exerted (in the direction of arrow F of FIG. 1) onto the flexible section 2, can easily been understood by comparing FIGS. 1 and 7. In the first Figure the connecting pipe section 3 is shown in the normal rest position on the support 38, the two parts 4 and 5 being held together by the connecting device 23 and the check valves 17 and 18 being in open position to allow the product to be transferred from one to the other of the two connected pipes. In FIG. 7, on the contrary, there is shown what happens if a tensile stress is exerted onto the flexible section 2, for example as caused by a movement of the ship away from the dock to which the ship is moored: such a tensile stress (arrow F) causes in fact the rotation of the pipe section 3 around the axis of the rotary joint 6, the result being that the operating levers 19 and 20 firstly collide with the respective parts 34 and 35 of the stationary structure 37, thereby causing the closure of the valves 17 and 18 and, therefore, of the two pipe parts 4 and 5, and then the head 27 collides with the part 36 of the stationary structure 37, thereby causing the rotation of the rod 19 around the pivot 32 with consequent disengagement of the pin 26 from the notch 30 and further consequent opening of the chain till now tightened around the flanges 21 and 22; the two pipe parts 4 and 5 are thus allowed to separate, one remaining attached to the stationary pipe section and the other remaining attached to the flexible pipe section 2, which in turn moves away with the pipe, and therefore with the ship, to which it is attached.

I claim:

1. A flexible connecting system disposed to be arranged between a stationary pipe and a movable pipe which can be moved away from said stationary pipe, characterized in that it comprises a first pipe section of rigid material connected to one of said pipes, a second pipe section of flexible material connected to the other of said pipes, a connecting pipe section of rigid material between said first and second sections fixed relative to said second pipe section and connected to said first pipe section so as to be movable with respect thereto only in one direction and in reply to a tensile stress exerted onto said second pipe section, said connecting pipe section in turn comprising two separable parts which are releasably connected to one another by a quick-release connecting device of a kind having thereon a movable control member, and being capable of allowing the separation of said two pipe parts in reply to a releasing force applied in a predetermined direction to said control member, and a stationary structure adjacent said connecting pipe section arranged in such a way as to be engaged by said control member and to apply to the latter said releasing force in said predetermined direction when a tensile stress exerted onto said second pipe section causes movement of said connecting pipe section in said one direction.

2. A flexible connecting system according to claim 1, characterized in that each of said separable parts of said connecting pipe section includes a respective check valve provided with an operating lever, said lever being arranged in such a way as to engage with part said stationary structure and to be moved thereby to a position in which said check valve is closed when said movement of said connecting pipe section occurs.

3. A flexible connecting system according to claim 2, characterized in that said stationary structure is constructed so as to be engaged by said check valve operating levers and to cause the complete closure of said check valves before being engaged by said control member of the quick-release connecting device.

4. A flexible connecting system according to claim 1, characterized in that said connecting pipe section is connected to said first section through a rotary joint capable of allowing a rotation of the former with respect to the latter in reply to exertion of said tensile stress on said second section.

* * * * *